Patented July 10, 1945

2,379,890

UNITED STATES PATENT OFFICE 2,379,890

ESTERIFICATION OF LIGNINS AND LIGNINLIKE MATERIAL

Rodger M. Dorland and Robert M. Boehm, Laurel, Miss., assignors to Masonite Corporation, Laurel, Miss., a corporation of Delaware No Drawing. Application June 20, 1942, Serial No. 447,870

22 Claims. (Cl. 106—163)

This invention relates to a ligno-cellulose composition, and to the process of preparing the same, said composition having excellent molding properties and improved physical and chemical characteristics as contrasted to previously known ligno-cellulose materials. It relates especially to a process whereby the hydrogen of selected hydroxyl groups of the lignin and ligninlike components is replaced by radicals, as benzoyl, furoyl, acetyl and sulfonyl, etc. to form esters and produce a material of improved properties which is stable and not readily attacked by alkali, and has improved plasticity, heat resistance and water resistance over similar products prepared by previously known methods. The selective esterification reaction of the lignin and lignin-like fractions is accomplished under controlled and mild conditions and it is unnecessary to separate the cellulose from the fractions since the proper groups of the lignin and lignin-like fractions may be selectively esterified in the presence of the cellulose.

While the invention may be carried out with various lignin-containing materials, it is preferable to first subject ligno-cellulose wood or woody materials, such as wood of trees and the wood fiber portions of annual products such as cornstalks, sugar cane, and the like, to hydrolysis.

This hydrolysis treatment of ligno-cellulose material serves to substantially convert hemi-celluloses present to soluble or dispersed state so that they may be removed as by washing. A small proportion of acids, such as formic and acetic acid is produced. These too may be removed by various procedures. The hydrolysis also appears to bring about some depolymerization of lignins, and to effect some degree of separation or breaking down of linkages between lignins and cellulose, or at least to make the lignin more responsive to selective reactions and treatments.

Boards and molded products made from such hydrolyzed and washed material are readily attacked by alkali. We attribute this to the presence of hydroxyl groups of lignin and depolymers of lignin, especially reactive phenolic hydroxyl groups which, in carrying out the present invention, are covered up, or in other words have the hydrogen thereof replaced by stable radicals, in order to get high resistance to attack by alkali. While alcoholic hydroxyl groups of the lingnin constituents are present, they are apparently not so readily reacted as to be a material factor in the attack by alkali.

It is an object of the invention to provide a process whereby the lignin-containing material is so treated that the products made therefrom are highly resistant to alkali.

Another object of the invention consists in providing a process whereby the ready reaction of lignin and depolymers thereof with alkali is utilized in bringing about a non-reversible esterification reaction which is productive of high alkali resistance, improved plasticity, and high heat and water resistance in the final product.

A further object consists in carrying out the reactions with the lignin components in the presence of the cellulose components of subdivided and preferably hydrolyzed wood or other ligno-cellulose material in such manner that after the lignin or part thereof has been converted to a substantially water-soluble state by the addition of alkali, it is reacted with ester-forming materials and the resulting resinous material formed in situ, thus providing a resinous bonding material ideally situated with respect to the cellulose for effectively performing a bonding function in the manufacture of boards, molded products, and the like.

According to a preferred embodiment of the invention, the lignin-containing material, after being hydrolyzed and washed, and in subdivided state, as fiber, or ground to powder, is subjected to treatment with dilute base, as sodium hydroxide, for example, the materials preferably being heated and stirred together. Other alkalies may be employed, as for example, potassium hydroxide and other alkali metal and ammonium hydroxides. Carbonates of the alkali metals and ammonium carbonate may also be used. Also, organic compounds which have a basic reaction may be used. Examples of such compounds are quinoline, pyridine, ethanolamine, triethylamine, tetramethylamine, and the like. As a general rule, due to the weaker basic reaction, larger quantities of organic bases must be used as compared to the quantity of inorganic basic material and thus for the benefit of economy and availability, inorganic basic materials such as sodium hydroxide are preferred. The treatment with the base is mild, and is controlled for the purpose of effecting reaction with the lignin and its depolymers and converting them or at least a large part thereof into a substantially water-soluble state, without being so drastic as to cause much if any attack on the cellulose, or to produce such breaking down of the lignin as to bring about production of new reactive hydroxyl groups. The hemi-celluloses having been principally removed, there is little or no reaction of the base material on hemi-cellulose.

Without commitment to particular theory, it appears that the solubility so obtained is a result of replacement of the hydrogen of lignin hydroxyl groups, especially phenolic hydroxyl groups which are more reactive, as for example with sodium to form sodium lignate, with water as a by-product.

When the esterification is to be performed in the anhydrous state, other materials for dissolving lignin may be utilized instead of the alkalies above referred to. For example, when esterifying with acetyl chloride, pyridine may be used for this purpose.

The esterifying agent may be added to the lignin containing material at any time prior to the heat treatment, as for example, the addition may be made at the time the base is added to the mixture. While the esterifying agent may be added earlier if desired, its addition is preferably made and reaction therewith carried out after the treatment with the base, and as a separate step. This can be done by merely adding the esterifying agent to the bath, usually with continued heating and stirring. The reaction may be carried on by following various procedures as for example heating the mixture until the desired esterification is obtained. If care must be taken to prevent loss of volatiles, the reaction may be carried on under heating and refluxing conditions. Another satisfactory method is mixing the lignin containing material, base and esterifying agent, and then heating the mixture under pressure until the desired degree of esterification has occurred.

Useful esterifying agents include acyl halides, such as benzoyl chloride, furoyl chloride, acetyl chloride, toluene-sulfonyl chloride, and the like. Chlorides of the various acylating compounds are preferred although the other acyl halides give satisfactory results. It is usually desirable to provide some slight excess of esterifying material to ensure getting as thorough esterification as practicable in a single-step esterification treatment.

When the stoichiometric quantity of esterifying agent is used, the reaction will normally progress to substantial neutrality. In case of some excess supply of esterifying agent, the resulting pH will ordinarily be lower, and such acidity is apparently brought about by some formation of acid, as hydrochloric acid, for example, after the alkali has been exhausted.

If pyridine is used for dissolving the lignin and the esterification is made with acetyl chloride, for example, the alkalinity of the reactants will not be appreciably lowered. In such case a neutralizing acid, such as a mineral acid, can be added after the reaction has proceeded sufficiently.

After the esterification treatment, the solids when washed for removal of salts produced and of any excess reagent, and rendered substantially dry, are ready for molding, or they may be formed from water into laps for board-making, etc.

The esterifying reaction which is effected using the reagents mentioned above is believed to consist in the replacement of the sodium (or other alkali metal, or ammonium or other basic radical) of the sodium lignate or the pyridinium of the pyridinium lignate by the acyl or other ester-forming radical with the formation in the former case of sodium halide and in the latter case of pyridinium chloride as a by-product. Inasmuch as there is excess pyridine, neutralization is required by the addition of mineral acid.

There are several indications that such is the route of reaction. One such indication is that with use of, say, benzoyl chloride as the esterifying agent, sodium chloride is formed, and the pH of the bath is lowered as the reaction continues. That the overall effect of the esterifying reaction serves to replace the hydrogen of the hydroxyl groups at least in large part by stably bonded radicals appears from the fact that the reaction is not reversible, that is to say, after the materials have been reacted in the manner described, the product is highly resistant to attack by alkali and has improved plasticity, heat resistance and water resistance.

The esterified lignins will precipitate from the alkaline solution and are generally in the form of a fine suspension as long as the solution is quite alkaline but when the pH of the solution decreases or approaches neutrality or becomes acid, the finely divided precipitate tends to agglomerate or coagulate and settle. In order to utilize the esterified lignins in operation, it is preferable that the product be substantially coagulated in order to make handling of the esterified product more practical.

One way in which the invention may be utilized to advantage is for the treatment of wood which has been hydrolyzed by exposure to high steam pressure in the Mason gun (e. g., U. S. Patent 1,824,221). As described in U. S. patent to Mason, Boehm & Koonce, No. 2,080,078, predominantly plastic material may be produced by relatively long-continued exposure to a steam pressure of about 300 to 1000 pounds per square inch, and the material reduced to fineness by explosion ensuing upon the opening of an outlet from the region of high steam pressure to a region of lower pressure such as atmospheric. Hardwoods such as gumwood are particularly well adapted for preparation of a predominantly plastic material in this way upon washing for removal of the water-solubles produced principally from the hemi-celluloses by such hydrolysis treatment. When such material is subjected to the esterification treatment of the present invention it is not only made highly resistant to alkalies, but its plasticity, heat resistance and water resistance are markedly improved.

Other methods of hydrolysis may be utilized in the present invention, as for example cooking the natural ligno-cellulose material with water or with added materials, within a temperature range of about 150° C. to 200° C. and for about 3 hours to render water-soluble a part of the ligno-cellulose material and especially substantially dissolve the hemi-celluloses. After thus treating the materials, the water-soluble components such as the remaining soluble hemi-celluloses are removed by washing or the like to prepare the lignins for the subsequent esterification treatment.

While other modes of hydrolysis and reducing to fineness may be used, the starting material used in the five following examples consisted of gumwood which had been exposed to approximately 600# steam pressure in a gun for about 45 seconds (or slightly longer when chips containing over 30% of water were used), and disintegrated to fiber by explosion, and washed for removal of solubles, the stated exposure to steam in the gun being sufficient to convert the material into a predominantly plastic state as described in said U. S. Patent No. 2,080,078.

Material prepared as above described is referred to in the following examples as "stock." Except where otherwise stated, the apparatus used in the examples consisted of a closed vessel, equipped with stirrer and reflux condenser. In each example, after completion of the reaction, the material was filtered and then thoroughly washed with water, and moisture content adjusted to approximately 4%.

sure at a temperature of about 180° C. for about 10 minutes, and the press platens were cooled under pressure before opening. Another sample of stock, without being subjected to esterification treatment, was similarly prepared, and is referred to as blank A.

Physical properties of samples and blank

| Example No. | Spec. grav. | Modulus of rupture, #/sq. in. | Rockwell hardness M-scale | Per cent uptake in 24 hrs. | | Blistering temperature, °C. |
|---|---|---|---|---|---|---|
| | | | | ($H_2O$) | (1% NaOH) | |
| Blank A | 1.43 | 6,500 | 93 | 2.0 | 53.0 | 135 |
| 1 | 1.43 | 6,910 | | 2.4 | 5.4 | 142 |
| 2 | 1.43 | 6,460 | | 1.5 | 6.5 | 185 |
| 3 | 1.44 | 5,720 | | 1.6 | 4.5 | (¹) |
| 4 | 1.40 | 6,920 | 113 | 2.3 | 2.4 | 263 |
| 5 | 1.43 | 5,640 | 103 | 1.1 | 6.6 | 165 |

¹ None @ 185°/15 min.

*Example 1.*—Using apparatus equipped with reflux condenser and stirrer, to 100 gm. of ground stock were added enough water to permit easy stirring, and 11 gm. of NaOH. The mixture was stirred for 5 minutes at approximately 27° C. and then 35.1 gm. of benzoyl chloride were added. The mixture was reacted with agitation and reflux condensation for 1 hour. The final pH was approximately 4.

*Example 2.*—Using apparatus as in Example 1, to 100 gm. of ground stock, 1200 gm. of water and 12 gm. of potassium hydroxide were added. The material was stirred for 10 minutes at 45° C., then 25.8 gm. of p-toluene sulfonyl chloride was run in. This was reacted for 40 minutes with stirring and reflux condensing at a temperature of approximately 61° C. The final pH was approximately 4.

*Example 3.*—Using apparatus as above, without the reflux condenser, to 100 gm. of ground stock 1000 gm. of water and 22 gm. of sodium hydroxide were added. The mixture was stirred for 15 minutes at room temperature. Thereafter the temperature was raised to 40° C. and 45.8 gm. of furoyl chloride were added. This reaction was continued for approximately 1 hour, and the final pH was approximately 7.

*Example 4.*—Using apparatus as in Example 3, to 600 gm. of pyridine (dry), 100 gm. of ground stock were added. The mixture was stirred thoroughly at 30° C. While cooling 59 gm. of acetyl chloride was added gradually by means of a dropping funnel, and the reaction was continued for 3¾ hours. Cooling is needed inasmuch as the reaction is exothermic. The resulting material which had a high pH and required neutralizing with acid was then poured into 730 gm. of concentrated sulfuric acid in 2000 gm. of water. To the resulting mixture 1% solution of sodium hydroxide was added until the mixture was weakly alkaline.

*Example 5.*—With apparatus as in Examples 3 and 4, 100 gm. of ground stock was added to 600 gm. of pyridine. The mixture was stirred thoroughly. Then 33 gm. of furoyl chloride and 19.8 gm. of acetyl chloride were added gradually and with cooling of the mixture. This was reacted for 1½ hour after which the alkalinity was adjusted to substantial neutrality. Sulfuric acid was used for neutralizing the basic material present.

The physical properties of samples made in the several examples are given in the following table. The samples each containing approximately 4% of $H_2O$ were pressed at about 1500 p. s. i. pressure at a temperature of about 180° C. for about 10 minutes, and the press platens were cooled under pressure before opening. Another sample of stock, without being subjected to esterification treatment, was similarly prepared, and is referred to as blank A.

To secure products having good impact strength, it is of advantage to introduce a buffering or buffer-forming agent into the wood chips or the ligno-cellulose material supplied to the gun, as by impregnation of these chips with a small proportion as 5% of sodium carbonate, for example. Without such provision, the hydrolysis which is performed in the gun is accompanied by production of acids, as acetic acid. In the absence of such buffering material these acids will attack the cellulose with deleterious effect on the strength of the final product made from the fiber. By buffering such acids, as formed, in the manner above described, this attack is reduced or avoided, leaving the cellulose in good condition as a filler to impart strength to the final product. Such impregnation and buffering per se is not included within the present invention, being described and claimed in application of W. H Mason and R. M. Boehm, Ser. No. 264,980. The ligno-cellulose material upon being treated in the gun with the buffering material and then subjected to the esterification treatment as described above has improved characteristics as compared to unbuffered stock.

In the above discussion, the stock material used as a raw material has been primarily in a ground state. If, however, fiber stock is used, the physical characteristics, on either buffered or unbuffered stock, upon being subjected to the esterification treatment, will be materially better, due primarily to the longer length ligno-cellulose fibers.

The novel procedure has thus far been described as applied to hydrolyzed wood chips containing only such lignins as are normally obtained from wood. It has been found, however, that the characteristics of the final esterified product may be varied over a wide range by changing the lignin content of the products subjected to the esterification treatment. This may be accomplished by adding hydrolyzed lignins to the hydrolyzed ligno-cellulose mixture and then esterifying the resulting mixture in the same manner as described above. It has also been found practical to add esterified lignins to esterified ligno-cellulose mixtures. It has further been found practical to add esterified lignins to hydrolyzed ligno-cellulose material to obtain suitable molding compositions. By varying the amount of esterified lignin present in the mixture the physical and chemical characteristics may be readily controlled, particularly the plasticity and flow of the final esterified molding compound. In view of the ability to control the characteristics of the final product, the novel product may be broadly used in the molding industry.

Within the scope of the present invention our esterification treatment may be applied not only to lignins obtained from wood and woody materials, but also to lignins obtained from waste sulfite liquors, soda liquors, etc., and also to various materials having properties similar to lignins, as for example tannins, phlobaphenes, lignin-like materials containing phenolic hydroxyls, etc., and as a generic expression to include lignin and such other material having lignin-like properties, we have made use of the generic expression "ligninous material" in certain of our claims.

The invention has many advantages: The entire treatment is simple and direct, consisting in its simplest embodiment of reacting the ligninous material with a base and continuing the reaction with the esterifying agent. If a ligno-cellulose material is used, the cellulose of the fibers may be left comparatively long and strong while the lignin, being largely put into substantially dissolved state by the base and then restored to solid state by the step of esterifying, is thoroughly distributed throughout the cellulose. The esterified resinous material being so distributed can serve most effectively as a bonding agent when the fiber is made use of for making boards or when cured in molds under heat and pressure. The water solubles removed by washing or in other ways following hydrolysis can be utilized for production of valuable products, as described and claimed in patent to Boehm No. 2,224,135.

The blistering temperature, referred to in the table, is the temperature at which a sample of the material, when subjected to heat without pressure tended to expand rapidly accompanied by rupturing of the surface.

Results substantially similar to those obtained with the esterification treatment claimed herein can be secured by an etherification treatment, and same is disclosed and claimed in the companion application, Ser. No. 447,869, filed by the present applicants on even date herewith.

Since it is obvious that many changes and modifications can be made in the details above described without departing from the nature and spirit of the invention, it is to be understood that the invention is not to be limited to these details except as set forth in the appended claims.

We claim:

1. Process of preparing an esterified ligninous composition suitable for use in molding compositions and the like, which comprises reacting a ligninous material with an esterifying compound in the presence of a basic compound at elevated temperatures to form a precipitated esterified ligninous composition in which only the hydroxyl groups of the ligninous material contributing to the solubility of the ligninous component in 1% aqueous alkali have been esterified.

2. Process of preparing an esterified ligninous material suitable for use in molding compositions and the like, which comprises the procedure described in claim 1, in which the esterifying agent is an acyl halide.

3. Process of preparing an esterified ligninous composition suitable for use in molding compositions and the like, which comprises reacting a ligninous material with an organic basic material and an esterifying compound at elevated temperatures to form a precipitated esterified ligninous composition in which only the hydroxyl groups of the ligninous material contributing to the solubility of the ligninous component in 1% aqueous alkali have been esterified.

4. Process of preparing an esterified lignin suitable for use in molding compositions and the like, which comprises mixing a lignin-containing material with an alkali, an esterifying compound and water, refluxing the mixture until the desired degree of esterification is obtained to form a precipitated reaction product of the esterifying compound and the lignin said base and esterifying compound being present in such quantities that only the acidic hydroxyl groups of the ligninous component will be esterified in the reaction.

5. Process of preparing an esterified lignin suitable for use in molding compositions and the like, which comprises the procedure as described in claim 4 in which said alkali and esterifying agent are present in quantities of substantially stoichiometric proportions.

6. Process of preparing an esterified lignin suitable for use in molding compositions and the like, which comprises mixing a lignin-containing material with water and an alkali to obtain a reaction between the lignin and alkali to form an aqueous alkali lignate solution, then adding an esterifying compound to the solution and heating the solution to react the esterifying compound and the alkali lignate until the desired degree of esterification is obtained to form a precipitated esterified lignin.

7. Process of preparing an esterified lignin suitable for use in molding compositions and the like, which comprises the procedure as described in claim 6, in which said alkali and esterifying agent are present in quantities of substantially stoichiometric proportions.

8. Process of preparing an esterified lignin suitable for use in molding compositions and the like, which comprises treating a lignin-containing material with an alkali, an esterifying compound and water, and subjecting the mixture to heat and pressure to react the esterifying compound and the lignin component until the desired degree of esterification is obtained to form a precipitated esterified lignin said base and esterifying compound being present in such quantities that only the acidic hydroxyl groups of the ligninous component will be esterified in the reaction.

9. Process of preparing an esterified lignin suitable for use in molding compositions and the like, which comprises the procedure as described in claim 8, in which said alkali and esterifying agent are present in substantially stoichiometric proportions.

10. Process of preparing an esterified lignin for use in molding compositions and the like, which comprises mixing a lignin-containing material with water and an alkali to obtain a reaction between the lignin and alkali to form an aqueous alkali lignate solution, then adding an esterifying compound to the solution, and subjecting the mixture to heat and pressure to react the esterifying compound and the alkali lignate until the desired degree of esterification is obtained to form a precipitated esterified lignin.

11. Process of preparing an esterified lignin for use in molding compositions and the like, which comprises the procedure as described in claim 10, in which the alkali and lignin are present in substantially stoichiometric proportions.

12. Process of preparing an esterified lignocellulose composition suitable for use as molding compositions and the like, which comprises treating a material containing partially hydrolyzed ligno-cellulose with an esterifying compound and a basic compound at elevated temperatures to react the esterifying compound and the lignin of the ligno-cellulose material until the desired degree of esterification of the lignins is obtained thereby precipitating the esterified components in the presence of the cellulosic material to form a molding composition.

13. Process of preparing an esterified lignocellulose composition suitable for use as molding compositions and the like, which comprises reacting a material containing partially hydrolyzed ligno-cellulose with an alkali in the presence of water, adding an esterifying compound to the mixture, refluxing the mixture to react the esterifying compound and the reaction product of the alkali and the ligno-cellulose until the desired degree of esterification of the lignins is obtained thereby precipitating the esterified components in the mixture to form a molding composition.

14. Process of preparing an esterified lignocellulose composition suitable for use as molding compositions and the like, which comprises reacting a material containing partially hydrolyzed ligno-cellulose with an alkali in the presence of water, adding an esterifying compound to the mixture, subjecting the mixture to heat and pressure to react the esterifying compound with the reaction product of the alkali and the lignocellulose until the desired degree of esterification of the lignins is obtained thereby precipitating the esterified components in the mixture to form a molding composition, said alkali and esterifying compound being present in such quantities that only the acidic hydroxyl groups of the ligninous component will be esterified in the reaction.

15. Process of preparing a molding composition including esterified ligno-cellulose and esterified lignins, which comprises treating a material containing partially hydrolyzed ligno-cellulose with an alkali, an esterifying compound and water at elevated temperatures to react the esterifying compound with the lignin of the ligno-cellulose material until the desired degree of esterification of the lignins is obtained and to precipitate the esterified components in the presence of the cellulose, and then adding an esterified lignin to the esterified ligno-cellulose mixture to form a molding composition, said alkali and esterifying compound being present in such quantities that only the acidic hydroxyl groups of the ligninous component will be esterified in the reaction.

16. A composition of matter suitable for molding or the like into products having the characteristics of improved stability, high alkali resistance, high heat resistance and improved resistance to water absorption, which includes an esterified lignin in which substantially only the hydroxyl groups of the lignin contributing to the solubility in 1% aqueous alkali have been esterified.

17. A composition of matter suitable for molding or the like into products having the characteristics of improved stability, high alkali resistance, high heat resistance and improved resistance to water absorption, which includes an esterified ligno-cellulose material in which substantially only the hydroxyl groups of the lignin contributing to the solubility in 1% aqueous alkali have been esterified.

18. A composition of matter suitable for molding or the like into products having the characteristics of improved stability, high alkali resistance, high heat resistance and improved resistance to water absorption, which includes a mixture of esterified lignins and a mixture of ligno-cellulose material in which only the lignin is esterified.

19. A composition of matter suitable for molding or the like into products having the characteristics of improved stability, high alkali resistance, high heat resistance and improved resistance to water absorption which includes a ligno-cellulose material, the lignin of the ligno-cellulose being esterified to such a degree that substantially only the hydroxyl groups contributing to the solubility of the lignin in 1% aqueous alkali have been esterified.

20. A composition of matter suitable for molding or the like into products having the characteristics of improved stability, high alkali resistance, high heat resistance and improved resistance to water absorption which includes a ligninous material having substantially only the hydrogen of phenolic hydroxyls of the ligninous material reacted with an ester-forming compound.

21. A composition of matter suitable for molding or the like into products having the characteristics of improved stability, high alkali resistance, high heat resistance and improved resistance to water absorption which includes an esterified ligninous material having substantially only the hydroxyl groups contributing to the solubility of the ligninous material in 1% aqueous alkali esterified.

22. Process of preparing a molding composition including an esterified lignin from ligno-cellulose material which comprises subjecting ligno-cellulose material to a partial hydrolysis treatment at elevated temperature and pressure, washing the hydrolyzed material to separate water soluble hydrolyzed components including acids from the non-water soluble hydrolyzed ligno-cellulose component, treating said component with alkali, and reacting the product so obtained with an esterifying compound whereby to effect esterification of lignin contained in said component and to precipitate the esterified lignin in the presence of the cellulose.

RODGER M. DORLAND.
ROBERT M. BOEHM.